(12) United States Patent
Lindsay

(10) Patent No.: US 6,820,654 B2
(45) Date of Patent: Nov. 23, 2004

(54) HIGH PERFORMANCE COMPOSITE TUBULAR STRUCTURES

(75) Inventor: Howard A. Lindsay, Scottsdale, AZ (US)

(73) Assignee: Vyatek Sports, Inc., Scottsdale, AZ (US)

(*) Notice: Subject to any disclaimer, the term of this patent is extended or adjusted under 35 U.S.C. 154(b) by 0 days.

(21) Appl. No.: 09/881,591

(22) Filed: Jun. 14, 2001

(65) Prior Publication Data

US 2002/0166595 A1 Nov. 14, 2002

Related U.S. Application Data

(60) Provisional application No. 60/211,904, filed on Jun. 16, 2000.

(51) Int. Cl.[7] ................................................. F16L 9/14
(52) U.S. Cl. ............................. 138/153; 138/DIG. 11; 428/36.91
(58) Field of Search ............................... 138/125, 104, 138/153, DIG. 11, 130, 122; 428/36.91

(56) References Cited

U.S. PATENT DOCUMENTS

| | | | |
|---|---|---|---|
| 147,446 A | 2/1874 | Stilwell | |
| 1,472,518 A | 10/1923 | Gillette et al. | |
| 2,143,852 A | * 1/1939 | Anderson | 156/143 |
| 2,327,347 A | 8/1943 | Gibbin | |
| 2,330,651 A | * 9/1943 | Welger | 138/133 |
| 2,648,720 A | * 8/1953 | Alexander | 174/34 |
| 3,047,026 A | * 7/1962 | Kahn | 138/122 |
| 3,259,405 A | * 7/1966 | Heller | 285/226 |
| 3,367,370 A | * 2/1968 | Sherlock | 138/104 |
| 3,379,220 A | * 4/1968 | Kiuchi et al. | 138/125 |
| 3,945,867 A | * 3/1976 | Heller et al. | 156/143 |
| 3,972,529 A | 8/1976 | McNeil | |
| D246,003 S | 10/1977 | Shimada | |
| 4,067,362 A | 1/1978 | Jackman | |
| 4,082,277 A | 4/1978 | Van Auken et al. | |
| 4,131,701 A | 12/1978 | Van Auken | |
| 4,304,266 A | * 12/1981 | Kutnyak et al. | 138/129 |
| 4,456,034 A | 6/1984 | Bixby | |
| 4,474,233 A | 10/1984 | Swozil | |
| 4,555,113 A | 11/1985 | Shimazaki et al. | |
| 4,698,890 A | 10/1987 | Neaves | |
| 4,725,060 A | 2/1988 | Iwanaga | |
| 4,830,059 A | 5/1989 | Silberstang | |
| 5,036,890 A | 8/1991 | Whaley | |
| 5,176,180 A | * 1/1993 | Williams et al. | 138/172 |
| 5,176,868 A | * 1/1993 | Davis | 264/257 |
| 5,195,675 A | 3/1993 | Ouden | |
| 5,209,136 A | * 5/1993 | Williams | 74/502.5 |
| 5,305,798 A | * 4/1994 | Driver | 138/98 |
| 5,485,948 A | 1/1996 | McCrink | |

(List continued on next page.)

FOREIGN PATENT DOCUMENTS

| | | |
|---|---|---|
| EP | 0 644 364 A1 | 3/1995 |
| WO | WO 95/05555 | 2/1995 |
| WO | WO 01/39847 A1 | 6/2001 |

*Primary Examiner*—James Hook
(74) *Attorney, Agent, or Firm*—Snell & Wilmer LLP

(57) ABSTRACT

This invention relates generally to the design and manufacture of high performance, composite, tubular structures. More specifically, the invention relates to a high performance, composite, tubular structure that utilizes an integral pattern of ribs on the internal diameter ("ID") or outer diameter ("OD") surface of the tube. The present invention provides high performance, composite, tubular structures that are both lighter and stiffer than conventional tubes. In general, the present invention incorporates unconventional features into the design of tubular structures, to greatly enhance performance. For example, in accordance with one preferred embodiment of the present invention, tubular structures are enhanced by incorporating small, stabilizing, raised ribs on the ID of the tubes.

7 Claims, 7 Drawing Sheets

U.S. PATENT DOCUMENTS

| | | | |
|---|---|---|---|
| 5,712,010 A | * 1/1998 | Russek et al. | 428/36.3 |
| 5,735,752 A | 4/1998 | Antonious | |
| 5,744,206 A | * 4/1998 | Russek et al. | 428/36.3 |
| 5,778,938 A | * 7/1998 | Chick et al. | 138/98 |
| 5,853,651 A | 12/1998 | Lindsay et al. | |
| 5,904,628 A | 5/1999 | MacKay, Jr. et al. | |
| 5,908,049 A | 6/1999 | Williams et al. | |
| 5,913,337 A | 6/1999 | Williams et al. | |
| 5,961,396 A | 10/1999 | Morell et al. | |
| 5,997,970 A | 12/1999 | You | |
| 6,000,435 A | * 12/1999 | Patel et al. | 138/122 |
| 6,024,134 A | 2/2000 | Akedo et al. | |
| D426,277 S | 6/2000 | McTague | |
| 6,129,962 A | * 10/2000 | Quigley et al. | 428/36.1 |
| 6,453,950 B1 | * 9/2002 | Smith | 138/125 |

* cited by examiner

HIGH PERFORMANCE COMPOSITE TUBULAR STRUCTURES

CROSS REFERENCES TO RELATED APPLICATIONS

This application claims priority to U.S. Provisional Patent Application Ser. No. 60/211,904 entitled "Net Molding of High Performance Composite Tubular Structures," filed Jun. 16, 2000.

BACKGROUND OF THE INVENTION

1. Technical Field of the Invention

This invention relates generally to the design and manufacture of high performance, composite, tubular structures. More specifically, the invention relates to high performance, composite, tubular structures that utilize an integral pattern of reinforcing ribs on the inner diameter ("ID") or outer diameter ("OD") surface of the tube.

2. Background of the Prior Art

Thin-walled, high performance, tubular structures have a wide variety of practical uses, such as for graphite composite golf shafts, arrows, bats, ski poles, hockey sticks, bicycle parts and many other applications. Current state of the art, high performance, tubular structures are constructed by various methods and from various materials. Designers of such tubular structures satisfy certain design criteria (such as strength, stiffness, weight and torsional behavior) by varying material types (fibers/resins), orientations of fiber directions and geometric proportions of the tube itself Another way designers have sought to improve high performance tubes is by developing new manufacturing techniques.

Using one manufacturing method, tubular structures are made by rolling material, such as pre-impregnated sheets of fiber/resin ("prepreg"), onto a "mandrel." The rolled layers of prepreg are then consolidated against the outer surface of the mandrel (called the "ID control surface") by wrapping the prepreg layers with shrink tape and curing via elevated temperature. FIG. 1 is a simplified diagram of this method, which involves wrapping layers of prepreg 108 around a mandrel 102 and wrapping a layer of shrink wrap material 104 around the layers of prepreg 108. Through the application of heat, the shrink wrap material 104 contracts, providing external compaction pressure 106 such that the layers of prepreg 108 are consolidated and cured to form a tubular structure.

FIGS. 2a and 2b are copies of magnified, cross sectional photographs of "flag wrapped" (FIG. 2a) and "filament wound" (FIG. 2b) high performance tubular structures made by the method described in FIG. 1. FIGS. 2a and 2b readily demonstrate wall irregularities 202, 204 in tubular structures which frequently result from conventional manufacturing techniques.

The standard flag wrapping and filament wound processes for manufacturing high performance tubes have several drawbacks due to the fact that, during consolidation/curing, the diameter of the tube is reduced. This reduction in diameter typically makes the final OD surface rough and irregular, thus requiring secondary finishing by centerless grinding and sanding. Grinding and sanding make the OD surface of the tubular structure uniform and smooth so that it can be painted to yield a cosmetically acceptable finish. However, the grinding/sanding process also typically cuts and abrades the outermost fibers of a tubular structure. Because these outermost fibers are the most highly stressed due to their location (i.e., $\sigma_{max}=MC/I$, where "C" is the distance to the outside layer), the grinding/sanding process usually reduces the structural integrity of a tubular structure.

One variation on the flag wrapping and filament wound techniques for making high performance tubular structures is to consolidate them from the inside, rather than the outside, thus yielding a "net molded" outer surface. This technique uses a female mold, rather than a grinding/sanding process, and the resulting outermost fibers are less distorted during consolidation/cure and are also not cut or abraded during grinding/sanding. The net molding technique also allows for the use of higher, more uniform, consolidation pressures than the conventional, shrink-wrap, flag wrapping and filament wound techniques. Higher consolidation pressures result in higher integrity laminates with fewer voids and, therefore, greater tubular strength.

Though the net molding technique may be an improvement over the shrink wrapping techniques, prior art methods for producing high performance, composite, tubular structures are still limited. One problem, aside from the wall irregularities discussed above, is the inability of prior art tubular structures to attain optimal wall thinness while retaining sufficient tubular strength. Whichever technique is chosen for manufacture, a designer typically strives to produce a tubular structure with a uniform, consistent, well-consolidated wall thickness, with undamaged, undistorted composite fibers. A designer also typically tries to make the wall of the tubular structure as thin as possible, to decrease the weight of the tube, while attaining sufficient wall stiffness and strength to enable the structure to be used for its intended purpose. For example, as the wall of a tubular structure is made thinner, its overall stiffness and strength usually decrease. A fundamental failure mode, such as buckling, of a tubular structure may result if the wall of the structure is too thin. A tube that buckles (typically from compression) cannot achieve its maximum strength. Buckling, in turn, usually leads to further structural failures, such as local fiber breaking and premature catastrophic structure failure.

Structural failure is especially likely if a tubular structure is bent when used for its intended purpose. FIGS. 3a and 3b, for example, show a tubular structure 302 with arrows representing tension 304 and compression 306 forces which might occur with bending 308. The combination of tension 304 on one side and compression 306 on the other side of a tubular structure 302 may cause deflection 310 of the structure, as shown in FIG. 3b. The stiffness of the wall of a tubular structure 302, determined by such factors as the material used to make the tube and the thickness of the wall of the tube, determines how much deflection 310 occurs when the tubular structure is loaded with bending forces. If deflection 310 reaches a certain point, a situation of exponential decay is reached, wherein the stresses present at the wall section increase exponentially until the wall eventually buckles catastrophically. Because instability is inherent in ultra-thin walls of tubular structures, designers generally must use thicker walls than are desirable, in order to achieve adequate stiffness (which translates to adequate stability). Therefore, using prior art methods to produce high performance, composite, tubular structures, the goal of optimal lightness is sacrificed somewhat to achieve requisite stiffness and strength. Accordingly, a long-felt need exists for a high performance, composite tubular structure, and a method for producing that structure, which will combine optimal wall thinness with optimal resistance to buckling and buckling-related stress.

SUMMARY OF THE INVENTION

The present invention satisfies the needs described above by providing high performance, composite, tubular structures that are lighter and/or more resistant to buckling-related stress than conventional tubes. In general, the present invention incorporates features into the design of tubular structures to enhance performance.

For example, in accordance with one preferred embodiment of the present invention, tubular structures are enhanced by incorporating small, stabilizing, raised ribs on the ID or OD of the tubes. These ribs enable designers to optimize the tubes' inertial properties (area mass moments of inertia) to achieve lighter weight, greater stiffness, increased strength or some combination of all three. The ribs may be configured in a variety of shapes and sizes, but are typically helical or circular, parallel or non-parallel, and/or may travel in opposite directions and cross over one another. In accordance with various aspects of the present invention, the ribs may also be hollow. Hollow ribs optionally allow specific materials that are different from the rest of the tubular structure to be included within the ribs. Thus, it will be readily apparent to one skilled in the art that countless combinations and variations of ribs according to one embodiment of the present invention are possible. Like I-beams used in construction, the integral ribs allow designers of tubular structures to use lesser amounts of material, thus optimizing wall thinness, white simultaneously maintaining wall stability and, therefore, strength.

DETAILED DESCRIPTION OF PREFERRED EMBODIMENTS

The following descriptions are of exemplary embodiments of the invention only, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the sprit and scope of the invention. For example, as described herein, integral ribs in accordance with the present invention are described as having a helical configuration, though, as mentioned above, various alternative configurations of ribs may likewise be used and still fall within the ambit of the appended claims.

Figure 4A:
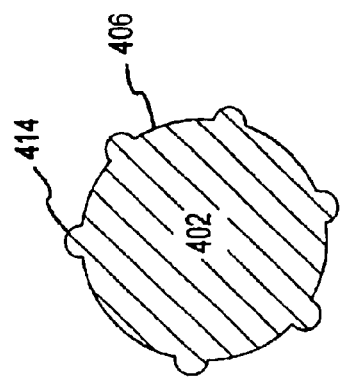
FIGS. 4a, 4b and 4c show, in cross-section, a method for fabricating an expandable, elastomeric tube using a "male" mold, which may be used in the manufacture of a high performance, composite, tubular structure with integrated ribs.
Figure 4B:
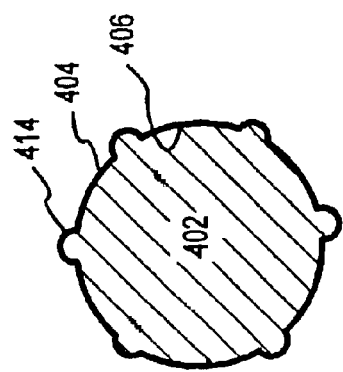
Figure 4C:
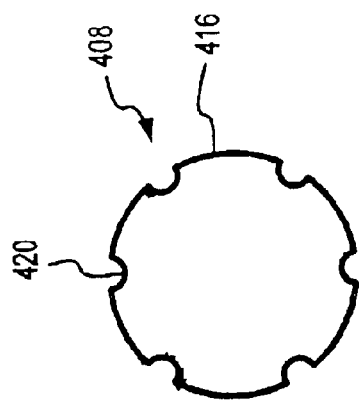

That being said, with reference to FIGS. 4a–4c and 5a–5c and in accordance with one exemplary embodiment of the present invention, an expandable, elastomeric tube 408, with an outer surface 416, comprises the innermost component of the mechanism used to manufacture a tubular structure. FIGS. 4a–4c show, in cross-section, one non-limiting structure used for fabricating an expandable, elastomeric tube 408 with a "male" mold 402. Male mold 402 can be made of any material commonly used by those skilled in the art for making molds. The surface 406 of male mold 402, according to the presently described embodiment, has a linear pattern of bumps 414. In one embodiment, bumps 414 have a helical pattern.

According to one embodiment, to fabricate expandable, elastomeric tube 408, male mold 402 is covered with a thin elastomeric membrane 404. Elastomeric membrane 404 may be composed of latex or any other substance suitable for manufacturing elastomeric tube 408. In one embodiment, male mold 402 may be dipped in liquid latex. Liquid latex is then dried to create elastomeric membrane 404 and elastomeric membrane 404 is pulled off of male mold 402. If elastomeric membrane 404 is pulled off of male mold 402 inside out, as is depicted in FIG. 4c, then the pattern of bumps 414 on male mold 402 creates a pattern of grooves 420 on outer surface 416 of expandable, elastomeric tube 408.

Figure 5A:
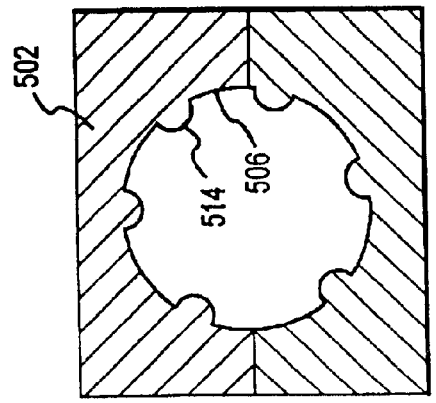
FIGS. 5a, 5b and 5c show, in cross-section, a method for fabricating an expandable, elastomeric tube using a "female" mold, which may be used in the manufacture of a high performance, composite, tubular structure with integrated ribs.
Figure 5B:
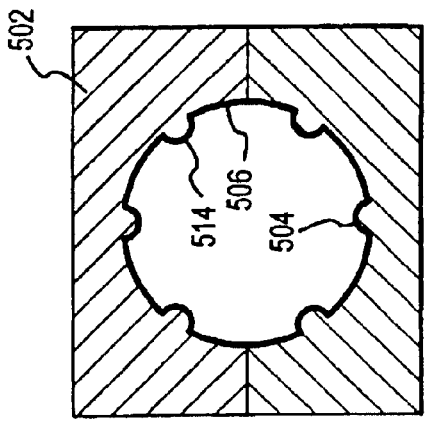
Figure 5C:
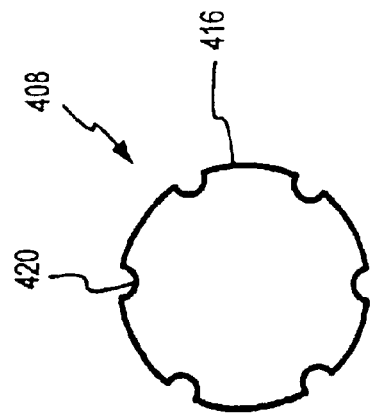

FIGS. 5a–5c show, in cross-section, another non-limiting structure used for fabricating an expandable, elastomeric tube 408 with a "female" mold 502. Female mold 502 can be made of any material commonly used by those skilled in the art for making molds. The inner surface 506 of female mold 502, according to the presently described embodiment, has a linear pattern of grooves 514. In one embodiment, grooves 514 have a helical pattern.

According to one embodiment, to fabricate expandable, elastomeric tube 408, inner surface 506 of female mold 502 is covered with a thin elastomeric membrane 504. Elastomeric membrane 504 may be composed of latex or any other substance suitable for manufacturing elastomeric tube 408. In one embodiment, female mold 502 may be dipped in liquid latex. Liquid latex is then dried to create elastomeric membrane 504 and female mold 502 is pulled off of elastomeric membrane 504. If elastomeric membrane 504 is not turned inside out, as depicted in FIG. 5c, the pattern of grooves 514 on female mold 502 creates the pattern of grooves 420 on outer surface 416 of expandable, elastomeric tube 408.

In accordance with one embodiment of the present invention, expandable, elastomeric tube 408 is suitably comprised of molded plastic pieces formed from conventional, thermoplastic polymers such as polyethylene or the like, and from conventional plastic molding techniques such as blow molding, injection molding, rotational molding, thermoforming, or the like. Expandable, elastomeric tube 408 may also be composed of rubber-type membranes, such as latex or silicone. Preferably, any material used for the elastomeric tube 408 is rigid enough to perform the "mandrel function" during lay-up operations. For example, preferably the material possesses characteristics which allow elastomeric tube 408 to expand during an elevated temperature cure (to permit part consolidation), while substantially simultaneously maintaining pressurization integrity. It will be understood by those skilled in the art that other materials and techniques may be used to produce equally effective elastomeric tubes 408. For example, a vacuum-forming technique may be used, wherein a sheet of polystyrene is placed around male mold 402, polystyrene and male mold 402 are placed in a vacuum bag, and heat and vacuum pressure are applied to cure the polystyrene around male mold 402. The foregoing examples are for exemplary purposes, and are not exclusive.

Figure 6B:
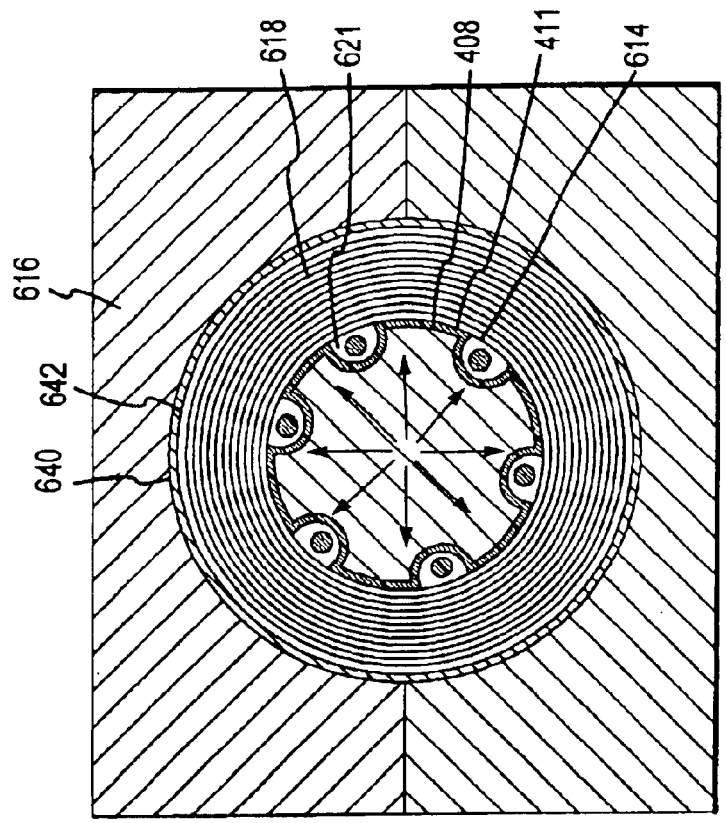
FIGS. 6a and 6b show, in cross-section, a method and apparatus for manufacturing high performance, composite, tubular structures with integrated ribs.
Figure 6A:
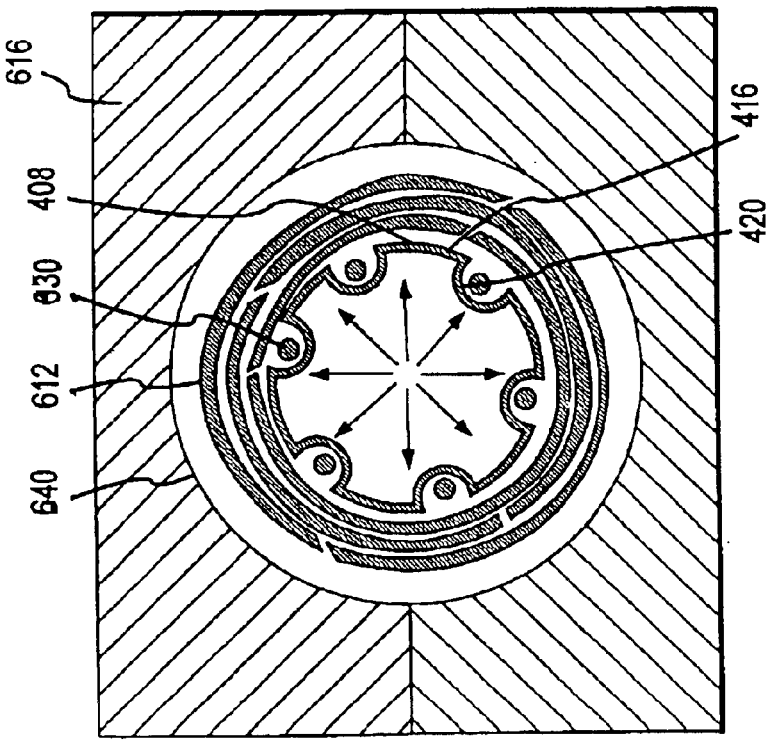

FIGS. 6a and 6b show, in cross-section, an apparatus for manufacturing a tubular structure 618 with integrated ribs 620, in accordance with the present invention. The apparatus includes expandable, elastomeric tube 408, with outer surface 416, manufactured as described above and as illustrated in FIGS. 4a–4c and 5a–5c. Strands of fiber 630, the fiber being fiberglass, graphite, or any other suitable material, are wrapped around elastomeric tube 408 so that strands of fibers 630 lie in grooves 420 of IML 416. Layers of prepreg 612 are placed around the circumference of expandable, elastomeric tube 408 and strands of fibers 630. Prepreg 612 may be standard modulus (33 Msi) graphite fiber with epoxy resin, but likewise may be any other prepreg material commonly known or as yet unknown to those skilled in the art for making high performance tubular structures, such as fiberglass, aramid, boron or thermoplastic or thermosetting resins. Multiple layers of prepreg 612 may be overlaid with fiber orientations at their junctions of any angle, from 0 to 90 degrees. Fiber orientations at the junctions of the layers 612 may effect stiffness and strength of the resulting tubular structure 618. Also, different reinforcement fibers may be used in different layers 612 to fabricate the tubular structure 618. For example, layers of graphite, fiberglass and aramid may be used to create a composite. The number and thickness of layers of prepreg 612 chosen depend on the characteristics of lightness, stiffness and strength the designer seeks to attain.

According to one embodiment of the present invention, a mandrel (not pictured in FIGS. 6a and 6b) may be placed inside expandable, elastomeric tube 408, to begin the consolidation process of strands of fibers 630 and layers of prepreg 612. The mandrel may be made of any hard substance, such as wood or metal. Typically, it is inserted into elastomeric tube 408, and the mandrel, tube 408, strands of fibers 630 and layers of prepreg 612 are manually rolled back and forth on a flat surface to initiate the consolidation and reduce the bulk of the layers 612.

Next, the mandrel is removed and expandable, elastomeric tube 408, covered by strands of fibers 630 and layers of prepreg 612, is placed into an external, curing mold 616. Elastomeric tube 408, strands of fibers 630, prepreg layers 612 and curing mold 616 are placed in a press, or any device suitable for pressurization and heat curing. For example, methods for pressurization might include using pressurized gas, pressurized liquid, or heat-expandable foams, pastes or beads. The consolidation and curing process involves inflating expandable, elastomeric tube 408 while heating. In one embodiment, elastomeric tube 408, strands of fibers 630, prepreg layers 612 and curing mold 616 are heated to approximately 200° F. to 400° F. and preferably 250° F. to 350° F., and more preferably approximately 300° F., and are pressurized to approximately 50 to 150 psi, and preferably 75 to 125 psi and more preferably approximately 100 psi. Expansion of elastomeric tube 408 applies pressure (represented by arrows within elastomeric tube 408 in FIG. 6a) against prepreg layers 612 and consolidates layers 612 against the inner surface 640 of curing mold 616. In accordance with one embodiment of the present invention, the process depicted in FIGS. 6a and 6b provides a substantially airtight seal between expandable, elastomeric tube 408, strands of fibers 630 and layers of prepreg 612, suitably allowing prepreg layers 612 to be consolidated against inner surface 640 of external, curing mold 616 via pressure applied by expandable, elastomeric tube 408.

FIG. 6b shows expanded elastomeric tube 408 and a fully-consolidated tubular structure 618 with integrated ribs 620 containing strands of fibers 630. During the consolidation/curing process, outer surface 416 of elastomeric tube 408, with its pattern of grooves 420, presses a pattern of integrated ribs 620 onto the ID (also called the "inner mold line" or "IML" 624) of tubular structure 618. Integrated ribs 620 make tubular structures 618 stiffer and allow for optimization of wall stability and thinness. In another embodiment of the present invention (not depicted in FIGS. 6a and 6b), integrated ribs 620 may be placed on the OD (also called the "outer mold line" or "OML" 642) of tubular structure 408. To do so, a pattern of grooves is built into the inner surface 640 of external curing mold 616 and the procedure just described for making tubular structure 618 is carried out. In addition to improved structural properties and performance, placing integrated ribs 620 on OML 642 gives tubular structures 618 the added benefit of a unique, visible, external design.

Figure 7:
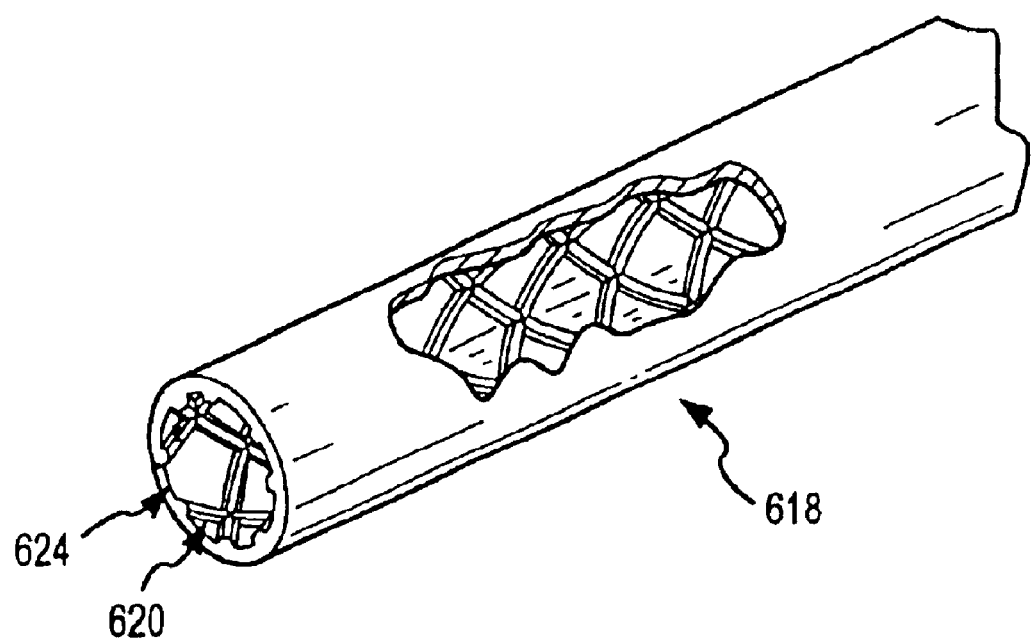
FIG. 7 is a longitudinal, cutaway view of a high performance, composite, tubular structure with integrated ribs on the ID of the structure.

According to one embodiment, after curing, tubular structure 618 and elastomeric tube 408 are removed from curing mold 616 and elastomeric tube 408 is removed from tubular structure 618. Removal may be accomplished by solvent extraction, manual extraction, or any other feasible means for removing elastomeric tube 408. In accordance with another embodiment, elastomeric tube 408 is left inside tubular structure 618. Leaving elastomeric tube 408 inside tubular structure 618 may provide a secondary function, such as damping vibrations in tubular structure 618. With reference now to FIG. 7, a longitudinal, cutaway view of a high performance, composite, tubular structure 618, manufactured in accordance with one embodiment of the present invention, illustrates integrated ribs 620 on the IML 624. In the embodiment depicted in FIG. 7, integrated ribs 620 are aligned in a pattern of two sets of helical lines. One set of ribs 620 is arranged in lines oriented at an angle of approximately 45 degrees, relative to the longitudinal axis of tubular structure 618. The other set of ribs 620 is arranged in lines oriented at an angle of approximately −45 degrees, relative to the longitudinal axis. Thus, the two sets of integrated ribs 620 are perpendicular to each other. In accordance with one aspect of the present invention, the process allows the orientation of integrated ribs 620 to be varied to achieve desired effects, such as improving stiffness by adjusting the angle of orientation of ribs 620 in relation to the longitudinal axis of tubular structure 618. For example, ribs 620 may be oriented at +/−45° to the longitudinal axis, as depicted in FIG. 7. Alternatively, ribs 620 could be oriented at angles other than +/−45° or could be non-parallel, or could be oriented such than no ribs 620 cross one another. Of course, the foregoing orientations are for exemplary purposes only and it will be apparent to those skilled in the art that any angles of orientation and patterns for ribs 620 may be used and that different angles and patterns will provide tubular structures 618 with different characteristics of stiffness and resistance to stress.

Figure 8A:
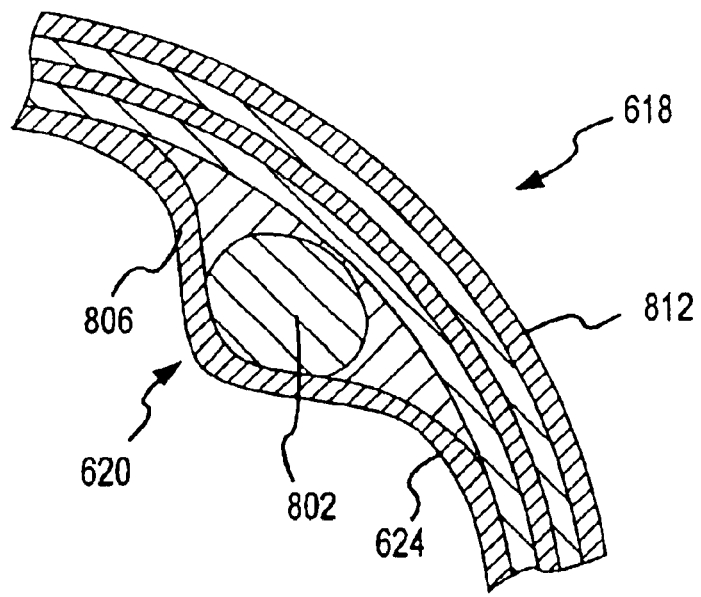
FIG. 8a is a magnified, cross-sectional view of part of a high performance, composite, tubular structure, with a rib on the ID of the structure made from a veil layer and integral metal.

In accordance with various embodiments of the present invention, integrated ribs 620 of high performance, composite, tubular structures may be manufactured from multiple different materials and in a variety of ways, to better achieve desired characteristics. For example, as shown in FIG. 8a, an integral metal reinforcement 802 may be used to reinforce rib 620. Integral metal reinforcement 802 may be incorporated into layers of prepreg used to construct tubular structure 618, such that it will create ribs 620 according to the pattern dictated by IML 416 of expandable, elastomeric tube 408 (shown in FIGS. 4, 5 and 6). Incorporated in this way, integral metal 802 is covered by a "veil layer" 806 of prepreg. Outer shell 812 of tubular structure 618, may be composed of any of a number of different materials, such as graphite, steel, aluminum, titanium or metal matrix components. Veil layer 806 comprises any suitable material having flexible/conformability properties such as graphite, fiberglass and the like. It will be evident to those skilled in the art that veil layer 806 and outer shell 812 of tubular structure 618 may be made of any material suitable for making tubular structures 618. Additionally, veil layer 806 and outer shell 812 may be made of different materials.

Integral metal reinforcement 802 in ribs 620 may be a different material from that used for the rest of tubular structure 618. For example, integral metal reinforcement 802 may be composed of graphite, fiberglass, Spectra, Kevlar or a discontinuous/chopped fiber. Different integral metals 802 will give tubular structures 618 different characteristics of stiffness, strength, weight, prevention of structural failure, electrical conductivity and the like. Of course, other alternative materials used for integral metal reinforcement 802, such as composites (e.g., different fibers or resins), metals (e.g., copper, aluminum, steel, titanium), plastics, ceramics or any other suitable material for reinforcement known to those skilled in the art may be used.

Figure 8B:
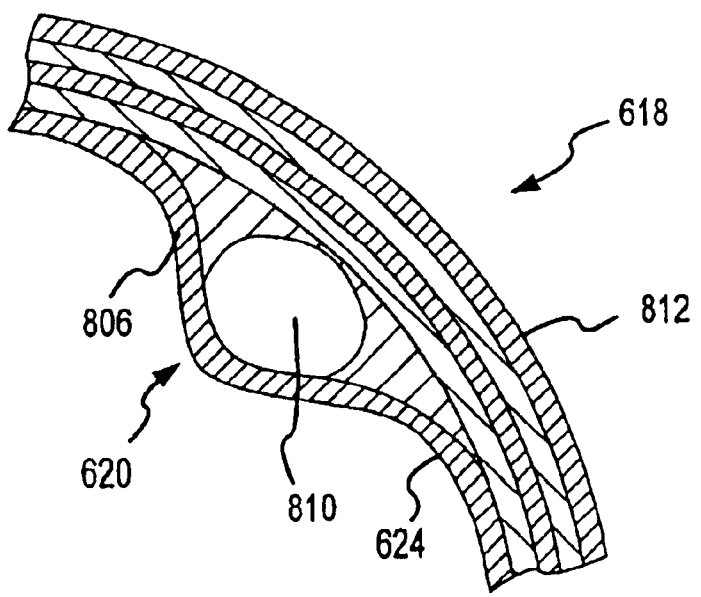
FIG. 8b is a magnified, cross-sectional view of part of a high performance, composite, tubular structure, with a hollow rib on the ID of the structure.

As illustrated in FIG. 8b and in accordance with another aspect of the present invention, a potentially advantageous type of integrated rib 620 is one with a hollow space 810. Integrated ribs 620 with hollow spaces 810 may be manufactured by molding dissolvable cores into layers of prepreg 612 used to construct tubular structure 618. This is similar to the process of incorporating integral metal 802 into layers of prepreg 612. After consolidation and curing of tubular structure 618, the dissolvable core that formed ribs 620 can be dissolved, leaving hollow spaces 810. Ribs 620 with hollow spaces 810 will likely give a tubular structure 618 more stiffness for a given weight than a tubular structure without ribs. Hollow spaces 810 may also be filled with electronic wires or actuators. A plausible variation is an integral system of sensors and actuators (such as piezoelectric) to create "smart" tubular structures 618 that bend or otherwise react according to predetermined values.

Figure 1:
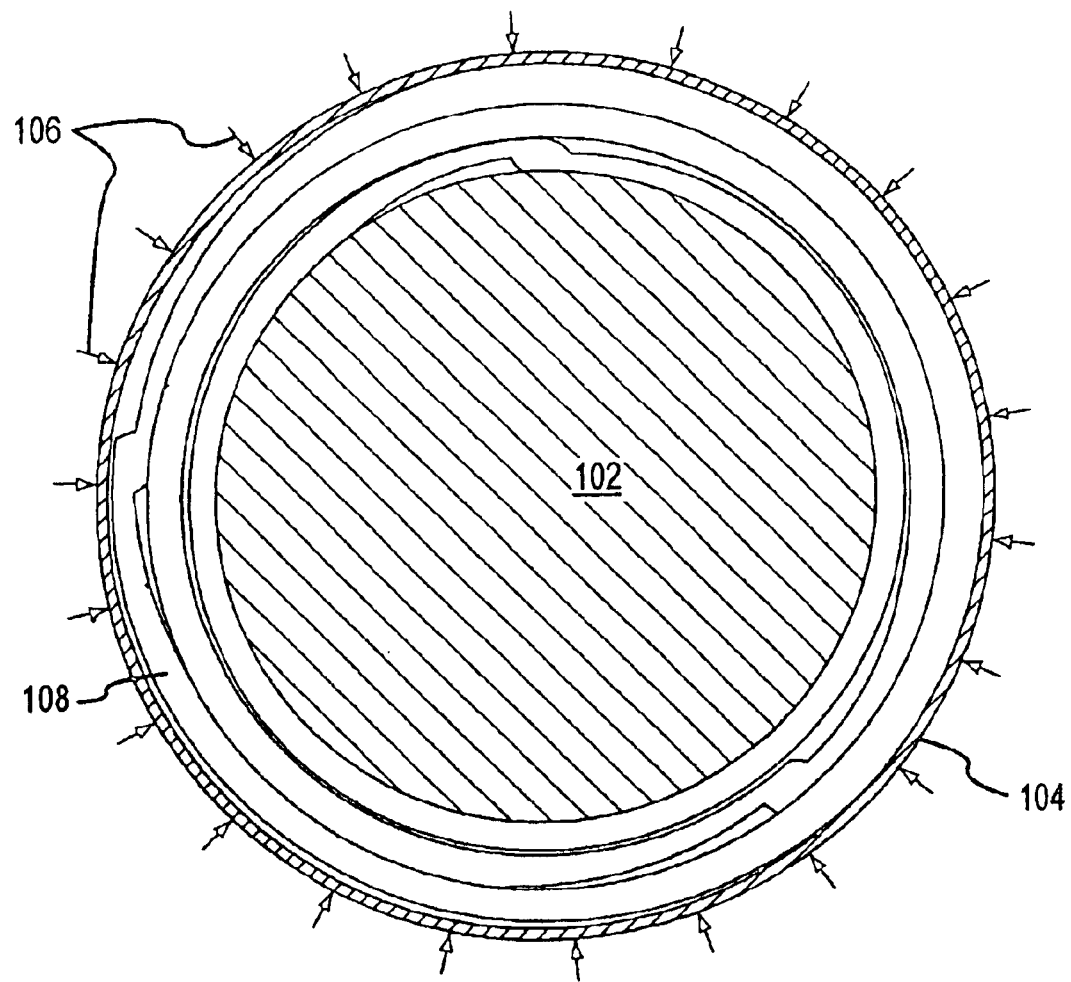
FIG. 1 is a cross-sectional diagram of the standard flag wrapping and filament wound processes for producing a high performance, composite, tubular structure.
Figure 2B:
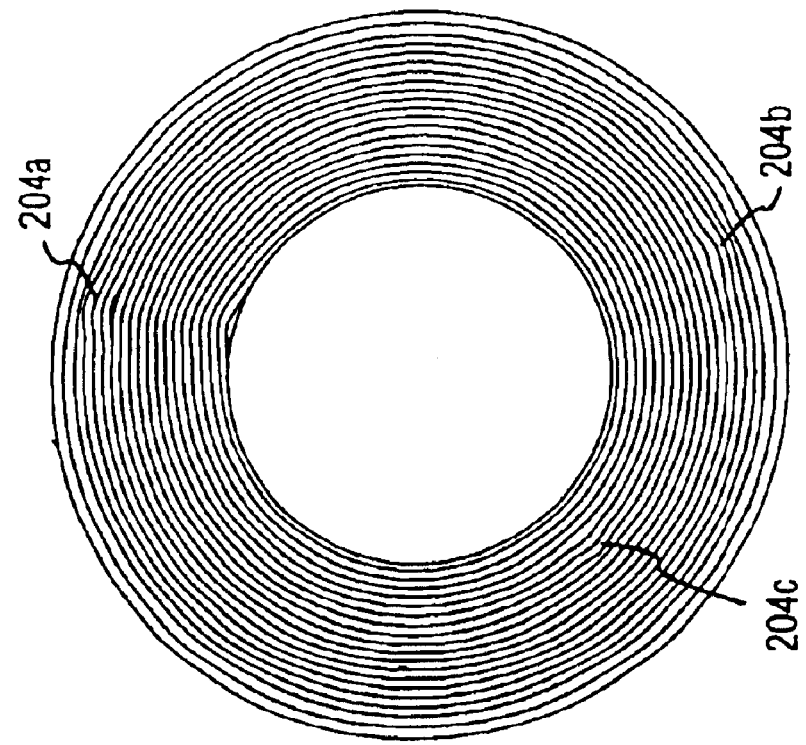
FIGS. 2a and 2b are copies of magnified, cross-sectional pictures of tubular structures produced by the prior art flag wrapping and filament wound processes, respectively.
Figure 2A:
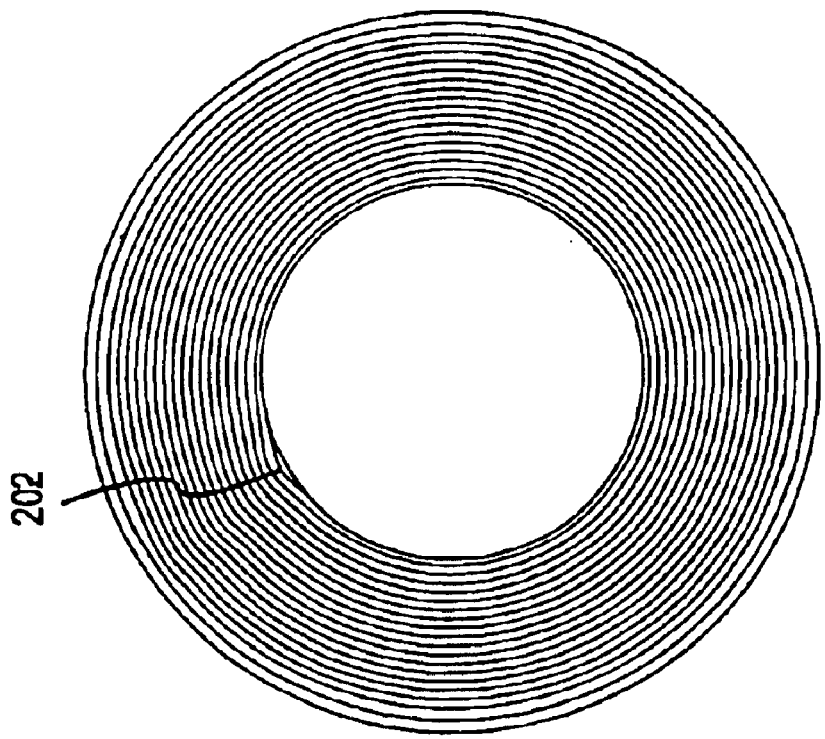
Figure 3A:
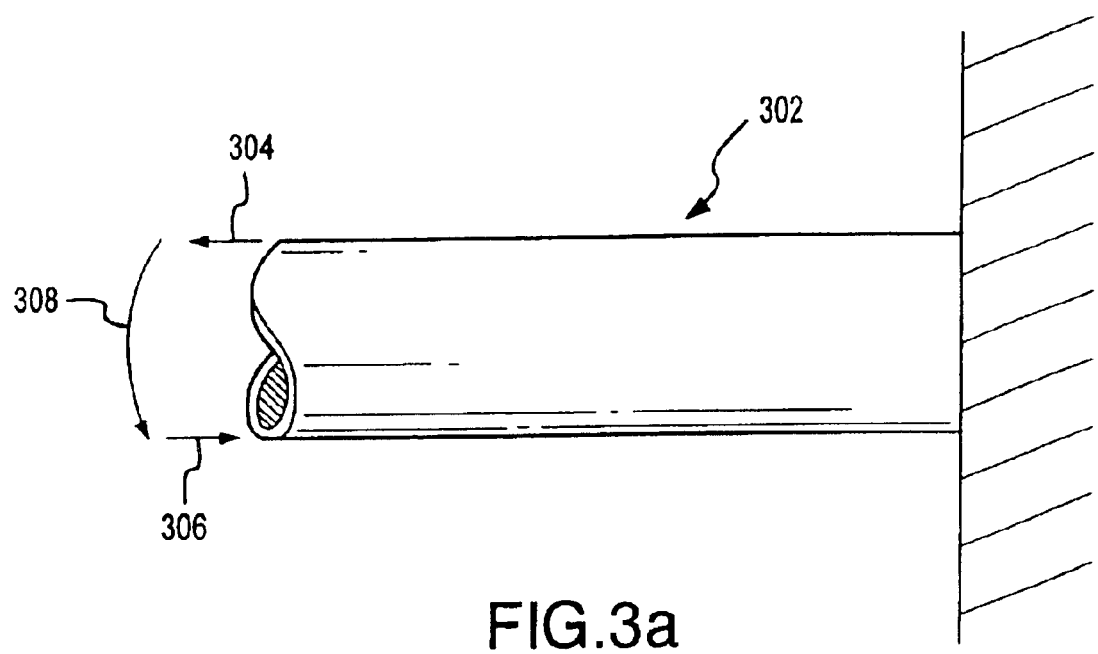
FIGS. 3a and 3b are longitudinal views of a tubular structure with applied forces of tension and compression and resulting deflection.
Figure 3B:
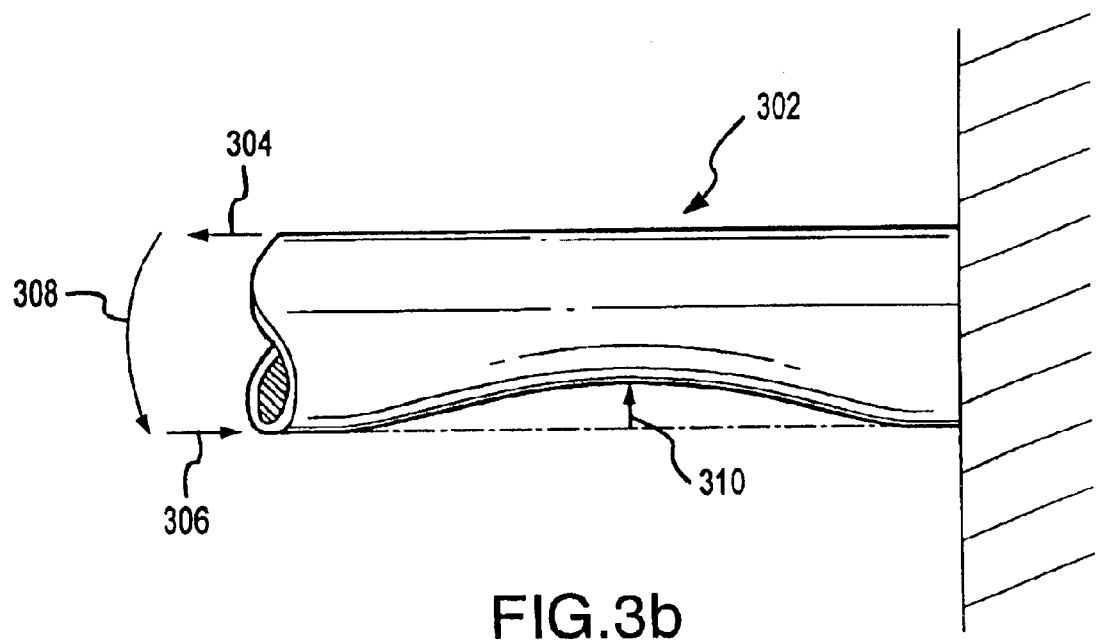

The potential benefit of manufacturing high performance, composite, tubular structures 618 with integrated ribs 620, in accordance with the present invention, is the ability to "tailor" the inertia properties of the tubular structures more precisely than can be accomplished with conventional methods. Thus, forces that will be placed on tubular structures 618, such as tension 304 and compression 306 (shown in FIGS. 3a and 3b), can be accounted for directly by using different orientations, patterns and/or materials for ribs 620. Furthermore, integrated ribs 620 accomplish the goals of added strength and stiffness without requiring thicker, heavier tubular structure 618 walls. This allows manufacturers to design ultra-light tubular structures 618 which flex longitudinally but resist buckling and buckling-related stress and, thus, have excellent torque control and stability. Furthermore, in addition to improved structural and performance properties, integrated ribs 620 placed on OML 642 of a tubular structures 618 give the structures a unique, visible, aesthetic design. Such improved tubular structures 618 with integrated ribs 620 may be used to manufacture golf shafts, arrows, bats, ski poles, hockey sticks, or any other article of manufacture requiring a high-performance tubular structure 618. Additionally, such tubular structures 618 may have a cross-sectional shape that is round, square, hexagonal or any other suitable shape and, due to the flexibility of expandable, elastomeric tube 408, non-straight tubular structures 618 may be designed and produced.

Lastly, as mentioned above, various principles of the invention have been described only as illustrative embodiments, and many combinations and modifications of the above-described structures, arrangements, proportions, elements, materials and components may be used in the practice of the invention. For example, methods and apparatuses not specifically described may be varied and particularly adapted for a specific environment and operating requirement without departing from those principles.

I claim:

1. A tubular structure, comprising:
   an outer surface;
   an inner surface; and
   at least two, stiffness increasing criss-crossing raised ribs, integrated with and extending from said inner surface, said ribs formed by a string of continuous strands of carbon fibers impregnated and at least partially encapsulated with at least one of a layer of prepreg.

2. A tubular structure according to claim 1, wherein the tub or structure is cylindrical.

3. A tubular structure according to claim 1, wherein a cross-section of the tubular structure is at least one of ovoid, triangular, rectangular and hexagonal.

4. A tubular structure according to claim 1, wherein the longitudinal axis of the tubular structure is a straight line.

5. A tubular structure according to claim 1, wherein the longitudinal axis of the tubular structure has at least one bent angle.

6. A tubular structure according to claim 1, wherein said raised ribs are is oriented from between about 0 and 90 degrees, relative to a longitudinal axis a the tubular structure.

7. A tubular structure according to claim 1, further comprising a composite veil layer of material, covering said ribs, that is the same as the material from which the rest of the tubular structure is made.

* * * * *